(12) United States Patent
Munari

(10) Patent No.: US 6,325,238 B1
(45) Date of Patent: Dec. 4, 2001

(54) DEVICE FOR FASTENING A COOKING VESSEL GRIP

(75) Inventor: Marco Munari, Cardano Al Campo (IT)

(73) Assignee: La Termoplastic F.B.M. S.r.l., Via del Tornago (IT)

( * ) Notice: Subject to any disclaimer, the term of this patent is extended or adjusted under 35 U.S.C. 154(b) by 0 days.

(21) Appl. No.: 09/559,834

(22) Filed: Apr. 28, 2000

(30) Foreign Application Priority Data

Apr. 30, 1999 (IT) .............................. MI990269 U

(51) Int. Cl.⁷ ...................................... B65D 25/28
(52) U.S. Cl. ..................... 220/759; 16/100 A; 16/110 R
(58) Field of Search ................. 220/752, 573.1, 220/912; 10/110 A, 110 R, 116 R

(56) References Cited

U.S. PATENT DOCUMENTS

| | | | |
|---|---|---|---|
| 2,246,393 | * | 6/1941 | Sperry .................................. 220/752 |
| 2,398,436 | * | 4/1946 | Mason .................................. 220/752 |
| 2,872,561 | * | 2/1959 | Humphrey ............................ 220/752 |
| 4,083,081 | * | 4/1978 | Witte .................................... 220/752 |
| 5,025,939 | * | 6/1991 | Bunn et al. .......................... 220/752 |
| 6,010,030 | * | 1/2000 | St. John et al. ..................... 220/752 |

FOREIGN PATENT DOCUMENTS

| | | |
|---|---|---|
| 235544 | 12/1944 | (CH) . |
| 19506419 | 3/1996 | (DE) . |
| 537272 | 5/1922 | (FR) . |
| 425546 | 4/1935 | (GB) . |
| 2136273 | 9/1984 | (GB) . |

* cited by examiner

*Primary Examiner*—Joseph M. Moy
(74) *Attorney, Agent, or Firm*—Liniak, Berenato, Longacre & White

(57) ABSTRACT

A device for mutually fastening at least two portions of a cooking vessel grip; the portions to be fastened have a continuous seat for the insertion of a fastening element having opposite end heads, which cooperate with and on which rest respective annular stop surfaces formed at opposite ends of the seat to secure the grip portions to one another; the fastening element is defined by two plugs, respective end portions of which are inserted concentrically by a predetermined length one inside the other, and are connected to each other with a predetermined amount of radial interference; and the end portions of the plugs have been welded to each other, e.g. by means of an ultrasonic welding process, after the plugs are inserted inside the seat, so that the plugs define a monolithic fastening element.

9 Claims, 2 Drawing Sheets

DEVICE FOR FASTENING A COOKING VESSEL GRIP

The present invention relates to a device for mutually fastening at least two portions of a cooking vessel grip, and which is particularly suitable for forming, simply and cheaply, cooking vessel grips defined by two half shells made of thermosetting polymer material (e.g. Bakelite or other phenol-formaldehyde resin) fitted to a central metal core.

BACKGROUND OF THE INVENTION

Cooking vessel grips are known, which comprise a central, metal, typically platelike core, the opposite faces of which are fitted with two half shells made of polymer material, in particular Bakelite or other phenolformaldehyde resin.

The half shells are normally screwed or riveted to each other and/or to the central core, both of which systems obviously involve relatively slow, complex assembly operations, thus increasing overall production cost.

SUMMARY OF THE INVENTION

It is an object of the present invention to provide a fastening device designed to eliminate the aforementioned drawbacks of known systems, and which, in particular, is cheap and easy to produce, and ensures effective, long-lasting permanent connection.

According to the present invention, there is provided a device for mutually fastening at least two portions of a cooking vessel grip, the device comprising at least two holes formed respectively through said grip portions and aligned with each other to define a continuous seat for the insertion of a fastening element; said holes having respective axial-stop means cooperating with and on which rest respective end heads of said fastening element to secure said grip portions one against the other; and the device being characterized in that said fastening element comprises a first and a second plug inserted respectively inside a first and a second of said holes, and having said respective end heads; said plugs comprising, at the opposite end to said end heads, respective end portions having irreversible connecting means for securing said end portions of said plugs integrally to each other, after said plugs are inserted inside said respective holes, so that said plugs define a monolithic said fastening element.

More specifically, said end portions of said plugs are inserted concentrically and by a predetermined length one inside the other, and are connected to each other with a predetermined amount of radial interference at at least one contact section : preferably, said end portions of said plugs have been welded to each other at said at least one contact section, e.g. by means of an ultrasonic welding process, after said plugs are inserted inside said respective holes, and after said end portions of said plugs are inserted one inside the other.

The present invention obviously also extends to any cooking vessel grip comprising a device, as described briefly above, for fastening two portions of the grip.

The fastening device according to the present invention is extremely cheap and easy to produce, ensures effective, long-lasting permanent connection, and enables fast, easy, low-cost production of cooking vessel grips, particularly of the type comprising two half shells made of thermosetting material and fitted to a central metal core. It is to be understood, however, that the fastening device according to the invention also applies equally to any other type of grip requiring the connection of at least two grip portions, however shaped and formed.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
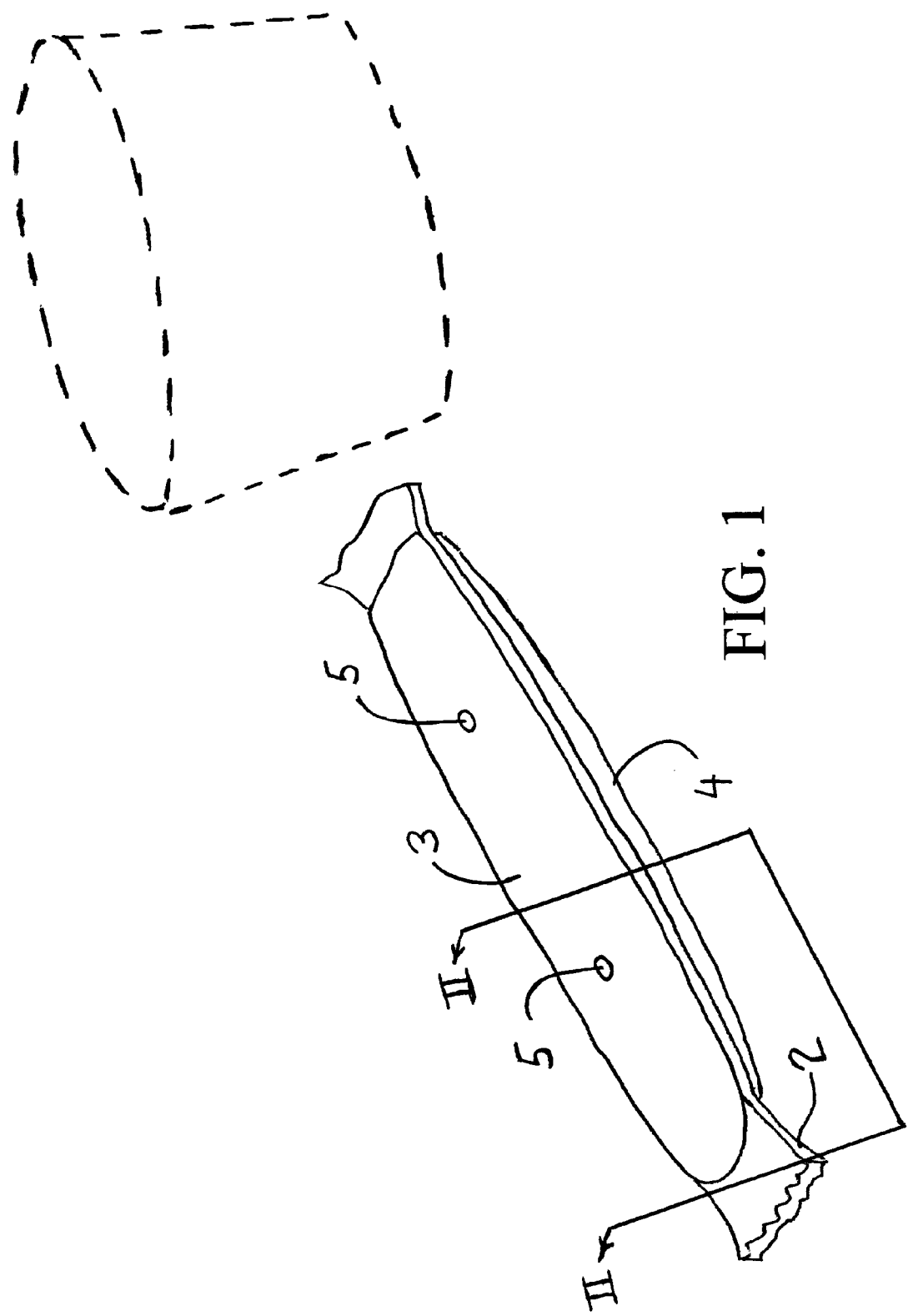
FIG. 1 shows a perspective view of the cooking vessel grip including a central, metal, typically platelike core and the fastening device in accordance with this invention.
Figure 2:
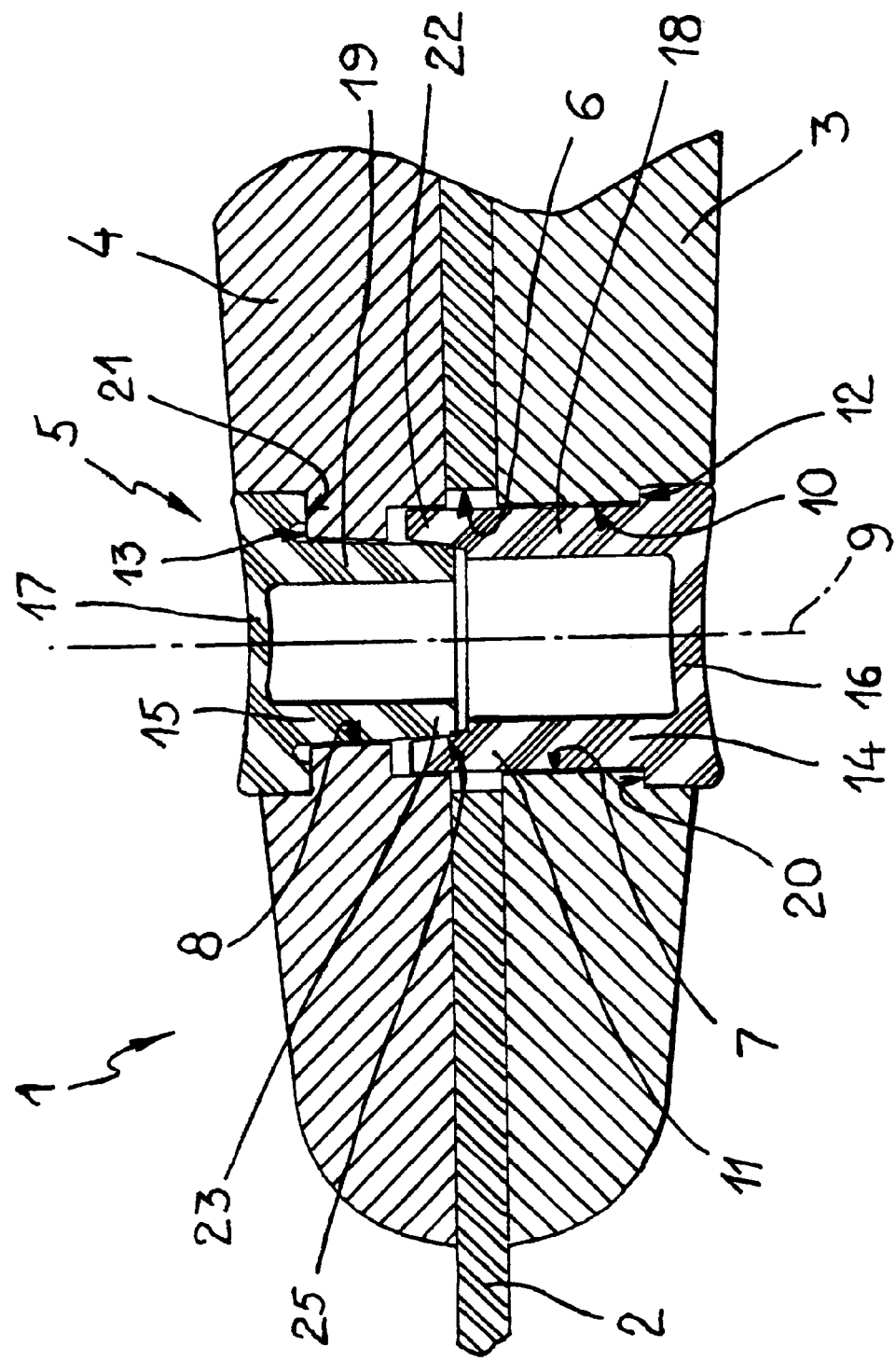
FIG. 2 shows a schematic longitudinal section of a fastening device taken along section line II—II of FIG. 1, in accordance with the present invention, applied to a cooking vessel grip.

Number 1 in the accompanying drawing indicates a cooking vessel grip of any shape and shown only partly. In the non-limiting example shown, grip 1 is of the type comprising a central core 2, e.g. a metal plate; and two symmetrical portions or half shells 3, 4 fitted to respective opposite surfaces of core 2, and made, for example, of a thermosetting polymer material such as phenol-formaldehyde resin (Bakelite). Grip 1 has at least one fastening device 5 for securing core 2 and half shells 3, 4 integrally to one another and so forming grip 1. In general, and especially in the case of grips in the form of elongated handles, provision will obviously be made for two fastening devices 5 aligned along the longitudinal axis of symmetry of grip 1.

More specifically, core 2 and half shells 3, 4 have respective, e.g. circular-section, through holes 6, 7, 8 aligned with one another along an axis 9 to define a continuous seat 10 for the insertion of a fastening element 11. Holes 7, 8 formed in half shells 3, 4 also comprise, at the respective mouths in respective outer boundary surfaces of half shells 3, 4, opposite respective annular stop surfaces 12, 13 defined by variations in the diameters of holes 7, 8.

According to the present invention, fastening element 11 comprises a first and a second plug 14, 15 preferably made of thermoplastic polymer material and defined by respective, e.g. circular, end heads 16, 17, from which extend respective cylindrical bodies 18, 19. The outside diameters of cylindrical bodies 18, 19 are smaller than the outside diameters of respective end heads 16, 17, so as to define, with end heads 16, 17, respective annular shoulders 20, 21, and are substantially equal to the inside diameters of respective holes 7, 8. Plugs 14, 15 are inserted inside respective holes 7, 8 so that respective annular shoulders 20, 21 rest against respective annular stop surfaces 12, 13 of holes 7, 8. Cylindrical bodies 18, 19 of plugs 14, 15 are both tubular and terminate, at the opposite ends to end heads 16, 17, with respective end portions 22, 23. Preferably, end portion 22 of plug 14 is internally truncated-cone-shaped, decreasing inwards in cross section, and end portion 23 of plug 15 is cylindrical. In any case, end portions 22, 23 comprise irreversible connecting means 25 for securing end portions 22, 23 of plugs 14, 15 integrally to each other, so that plugs 14, 15 define a monolithic fastening element 11.

More specifically, end portion 23 of plug 15 is of such an outside diameter as to be force fitted with a predetermined amount of radial interference inside the corresponding end portion 22 of plug 14; and end portions 22, 23 of plugs 14, 15 are inserted concentrically and by a predetermined length one inside the other, and are connected to each other with a predetermined amount of radial interference at at least one contact section.

To assemble grip 1, once core 2 and half shells 3, 4 are assembled with holes 6, 7, 8 aligned with one another, plugs 14, 15 are inserted separately inside respective holes 7, 8; end portion 23 of plug 15 is force fitted inside end portion 22 of plug 14 until plugs 14, 15 are arrested axially with annular shoulders 20, 21 resting on annular stop surfaces 12, 13; and, at this point, end portions 22, 23 of plugs 14, 15 are welded to each at the contact section, preferably by means of a known ultrasonic welding process.

Clearly, changes. may be made to the fastening device and grip as described herein without, however, departing from the scope of the present invention.

What is claimed is:

1. A device (5) for mutually fastening at least two portions (3, 4) of a cooking vessel grip (1), the device comprising at least two holes (7, 8) formed respectively through said grip portions (3, 4) and aligned with each other to define a continuous seat (10) for the insertion of a fastening element (11); said holes (7, 8) having respective axial-stop means (12, 13) cooperating with and on which rest respective end heads (16, 17) of said fastening element (11) to secure said grip portions (3, 4) one against the other; and the device (5) being characterized in that said fastening element (11) comprises a first and a second plug (14, 15) inserted respectively inside a first and a second of said holes (7, 8), and having said respective end heads (16, 17); said plugs (14, 15) comprising, at the opposite end to said end heads (16, 17), respective end portions (22, 23) having irreversible connecting means (25) for securing said end portions (22, 23) of said plugs (14, 15) integrally to each other, after said plugs (14, 15) are inserted inside said respective holes (7, 8), so that said plugs (14, 15) define a monolithic said fastening element (11).

2. A device as claimed in claim 1, characterized in that said end portions (22, 23) of said plugs (14, 15) are inserted concentrically and by a predetermined length one inside the other, and are connected to each other with a predetermined amount of radial interference at at least one contact section.

3. A device as claimed in claim 2, characterized in that said end portions (22, 23) of said plugs (14, 15) have been welded to each other at said at least one contact section, preferably by means of an ultrasonic welding process, after said plugs (14, 15) are inserted inside said respective holes (7, 8), and after said end portions (22, 23) of said plugs are inserted one inside the other.

4. A device as claimed in claim 3, characterized in that said axial-stop means comprise opposite respective annular stop surfaces (12, 13) formed at respective end edges of said holes (7, 8); said plugs (14, 15) comprising respective cylindrical bodies (18, 19) extending towards each other from said respective end heads (16, 17) and having outside diameters smaller than the outside diameters of said end heads (16, 17), so as to define, axially, respective annular shoulders (20, 21) cooperating axially with and on which rest said annular stop surfaces (12, 13).

5. A device as claimed in claim 4, characterized in that said first plug (14) comprises a hollow cylindrical body (18), the end portion (22) of which has a predetermined inside diameter; said end portion (23) of said second plug (15) being of such an outside diameter as to be force fitted to said end portion (22) of the first plug (14) with said predetermined amount of radial interference.

6. A device as claimed in claim 1, characterized in that said plugs (14, 15) are made of thermoplastic polymer material; said grip portions (3, 4) being made of thermosetting polymer material.

7. A device as claimed in claim 1, characterized by also comprising a third grip portion (2) interposed between said two grip portions (3, 4) and in turn having a third through hole (6) aligned with said first and second hole (7, 8) to define, with said first and second hole, said continuous seat (10) for the insertion of said fastening element (11).

8. A cooking vessel grip (1), characterized by comprising at least one device (5) for mutually fastening two portions of the grip as claimed in claim 1.

9. A cooking vessel grip (1) comprising a central core (2), and two half shells (3, 4) fitted to respective opposite surfaces of said core (2); said core (2) and said half shells (3, 4) having respective through holes (6, 7, 8) aligned with one another to define a continuous seat (10) for the insertion of a fastening element (11); said seat (10) having, at opposite longitudinal ends, respective axial-stop means (12, 13) cooperating with and on which rest opposite respective end heads (16, 17) of said fastening element (11) to grip said core (2) between said half shells (3, 4), the grip (1) being characterized in that said fastening element (11) comprises a first and a second plug (14, 15) inserted, on opposite sides, inside said seat (10), and having said respective end heads (16, 17); said plugs (14, 15) comprising, at the opposite end to said end heads (16, 17), respective end portions (22, 23) having irreversible connecting means (25) for securing said end portions (22, 23) of said plugs (14, 15) integrally to each other, after said plugs (14, 15) are inserted inside said seat (10), so that said plugs (14, 15) define a monolithic said fastening element (11).

* * * * *